US012381594B2

(12) United States Patent
Woodburn et al.

(10) Patent No.: US 12,381,594 B2
(45) Date of Patent: Aug. 5, 2025

(54) DEVICES AND METHODS FOR USING SEPARATE ADVERTISEMENT STREAMS IN A SINGLE BEACON DEVICE

(71) Applicant: ZEBRA TECHNOLOGIES CORPORATION, Lincolnshire, IL (US)

(72) Inventors: Richard Lawerance Woodburn, Cupertino, CA (US); Edward W. Geiger, San Martin, CA (US); Yu Wan, Cupertino, CA (US); Janakiraman Gopalan, Cupertino, CA (US)

(73) Assignee: Zebra Technologies Corporation, Lincolnshire, IL (US)

(*) Notice: Subject to any disclaimer, the term of this patent is extended or adjusted under 35 U.S.C. 154(b) by 463 days.

(21) Appl. No.: 17/895,748

(22) Filed: Aug. 25, 2022

(65) Prior Publication Data
US 2024/0072840 A1  Feb. 29, 2024

(51) Int. Cl.
*H04W 4/00* (2018.01)
*H04B 1/38* (2015.01)
*H04B 1/69* (2011.01)
*H04W 4/80* (2018.01)

(52) U.S. Cl.
CPC ............ *H04B 1/69* (2013.01); *H04B 1/38* (2013.01); *H04W 4/80* (2018.02); *H04B 2001/6912* (2013.01)

(58) Field of Classification Search
None
See application file for complete search history.

(56) References Cited

U.S. PATENT DOCUMENTS

| 9,258,765 | B1 | 2/2016 | daCosta |
| 2014/0254466 | A1 | 9/2014 | Wurster et al. |
| 2017/0070847 | A1 | 3/2017 | Altman et al. |
| 2018/0184380 | A1* | 6/2018 | Xue .................. H04W 4/80 |
| 2018/0192460 | A1 | 7/2018 | Huh |
| 2019/0373477 | A1 | 12/2019 | Gulick, Jr. et al. |

OTHER PUBLICATIONS

International Search Report and Written Opinion for International Application No. PCT/US2023/28540 mailed on Oct. 19, 2023.

\* cited by examiner

*Primary Examiner* — Zewdu A Beyen

(57) ABSTRACT

Devices and methods for using separate advertisement streams in a single beacon device are disclosed herein. An example beacon device includes at least one processor, a radio transceiver, and a memory. The memory may store instructions that, when executed by the at least one processor, cause the beacon device to receive a set of beacon information captured during a scan period. The instructions may further cause the beacon device to transmit a captured beacon stream (CBS) that includes beacon information from the set of beacon information. The instructions may further cause the beacon device to transmit, to a mobile device, a waypoint beacon stream (WBS) including a protocol data unit (PDU) data payload. The PDU data payload may encode a media access control (MAC) identifier adjacent to a type field indicative of a format for heartbeat data encoded in the PDU data payload.

18 Claims, 8 Drawing Sheets

DEVICES AND METHODS FOR USING SEPARATE ADVERTISEMENT STREAMS IN A SINGLE BEACON DEVICE

BACKGROUND

Digital technology is rapidly taking over today's industrial networks for locationing services. Those entities able to leverage this technology will generally have a performance edge over their competition. More specifically, location data insight has quickly developed into a necessary component of entities seeking to track locations and statuses of their assets, enhance the productivity of their workers, and to generally optimize workflows. As such, development of devices that reliably provide cost-effective, proximity-based asset visibility solutions, and that are simultaneously easy to deploy, simple to manage, and secure are a topic of great interest in the field of industrial networking.

However, conventional locationing devices suffer from several drawbacks that prevent them from providing such reliable, effective, and secure locationing services. Namely, conventional locationing devices transmit data over a single advertisement stream, which limits the scope of functionality provided by these devices. For example, a conventional locationing device may transmit data across the single advertisement stream to provide way-finding functionality for individual mobile device users, but the conventional locationing device may be unable to capture and/or track data associated with devices within range of the conventional locationing device. These conventional locationing devices also suffer from being unable to effectively (or entirely) transmit data to a wide variety of user devices (e.g., mobile phones) that are executing way-finding applications, thereby disabling the conventional devices from interoperating with large portions of the user device marketplace. Consequently, conventional locationing devices suffer from numerous issues that minimize the interoperability of the overall networking system, reduce the efficiency and general timeliness of information delivery between devices, and create an unsavory user experience.

Thus, there is a need for devices and methods for using separate advertisement streams in a single beacon device that allows for fast, efficient, secure, and reliable networking data transmission across a wide variety of user devices within a networking system.

SUMMARY

In an embodiment, the present invention is a beacon device that may utilize separate advertisement streams. The beacon device may comprise: at least one processor; a radio transceiver; and a memory storing instructions that, when executed by the at least one processor, cause the beacon device to: receive, by the radio transceiver, a set of beacon information captured during a scan period, the set of beacon information including beacon information that is associated with an asset beacon disposed proximate to the beacon device, transmit, by the radio transceiver to a receiver device, a captured beacon stream (CBS), the CBS including a cycle of transmission loops, each transmission loop of the cycle of transmission loops includes a set of chirps, and each chirp of the set of chirps including beacon information from the set of beacon information, and transmit, by the radio transceiver to a mobile device, a waypoint beacon stream (WBS) including a protocol data unit (PDU) data payload, wherein the PDU data payload encodes a media access control (MAC) identifier adjacent to a type field indicative of a format for heartbeat data encoded in the PDU data payload.

In a variation of this embodiment, the radio transceiver is a Bluetooth Low Energy (BLE) radio transceiver.

In another variation of this embodiment, the PDU data payload has a packet structure comprising: (i) a prefix field, (ii) a beacon data field, (iii) a minor field, and (iv) a transmission power field, and the MAC identifier is encoded in the beacon data field. Further in this variation, the instructions, when executed by the at least one processor, may further cause the beacon device to: transmit, by the radio transceiver, the packet structure to the mobile device, such that the mobile device can receive and decode the MAC identifier encoded in the beacon data field. Moreover, the minor field may encode (i) a current version, (ii) channel information, and (iii) a battery life. Additionally, the beacon data field may be encoded by bytes assigned to a UUID field and a major field defined in an iBeacon beaconing mode.

In yet another variation, the radio transceiver is configured to transmit the CBS with a first predefined antenna gain profile, and to transmit the WBS with a second predefined antenna gain profile that is different from the first predefined antenna gain profile.

In yet another variation, the set of chirps is sequentially identical within each transmission loop of the cycle of transmission loops.

In still another variation, the PDU data payload is a first PDU data payload, the MAC identifier is a first MAC identifier associated with the beacon device, and the type field is indicative of a first type field value. Moreover, the CBS includes a second PDU data payload, the second PDU data payload encodes a second MAC identifier adjacent to the type field, the type field is indicative of a second type field value, the second type field value is indicative of the beacon information being encoded in the second PDU data payload, and the second MAC identifier is associated with the asset beacon disposed proximate to the beacon device.

In yet another variation, the radio transceiver is a set of radio transceivers, the set of radio transceivers includes a first radio transceiver, a second radio transceiver, a third radio transceiver, and a fourth radio transceiver. Further in this variation, the beacon device further comprises: a first system on a chip (SoC) that includes the first radio transceiver and a first controller, wherein the first radio transceiver is configured to receive the set of beacon information on a first radio frequency (RF) channel; a second SoC that includes the second radio transceiver and a second controller, wherein the second radio transceiver is configured to receive the set of beacon information on a second RF channel that is different from the first RF channel; a third SoC that includes the third radio transceiver and a third controller, wherein the third radio transceiver is configured to receive the set of beacon information on a third RF channel that is different from the first RF channel and the second RF channel; and a fourth SoC that includes the fourth radio transceiver and a fourth controller, wherein the fourth radio transceiver is configured to transmit the set of beacon information to the receiver device on one of: the first RF channel, the second RF channel, or the third RF channel.

In another embodiment, the present invention is a method for transmitting separate advertisement streams using a beacon device. The method may comprise: receiving, by a radio transceiver, a set of beacon information captured during a scan period, the set of beacon information including beacon information that is associated with an asset beacon disposed proximate to the beacon device; transmitting, by the radio transceiver to a receiver device, a captured beacon stream (CBS), the CBS including a cycle of transmission loops, each transmission loop of the cycle of transmission loops includes a set of chirps, and each chirp of the set of chirps including beacon information from the set of beacon information; and transmitting, by the radio transceiver to a mobile device, a waypoint beacon stream (WBS) including a protocol data unit (PDU) data payload, wherein the PDU data payload encodes a media access control (MAC) identifier adjacent to a type field indicative of a format for heartbeat data encoded in the PDU data payload.

In a variation of this embodiment, the radio transceiver is a Bluetooth Low Energy (BLE) radio transceiver.

In another variation of this embodiment, the PDU data payload has a packet structure comprising: (i) a prefix field, (ii) a beacon data field, (iii) a minor field, and (iv) a transmission power field, and the MAC identifier is encoded in the beacon data field. Further in this variation, the method may further comprise transmitting, by the radio transceiver, the packet structure to the mobile device, such that the mobile device can receive and decode the MAC identifier encoded in the beacon data field. Moreover, the minor field may encode (i) a current version, (ii) channel information, and (iii) a battery life. Additionally, the beacon data field may be encoded by bytes assigned to a UUID field and a major field defined in an iBeacon beaconing mode.

In yet another variation of this embodiment, the set of chirps is sequentially identical within each transmission loop of the cycle of transmission loops.

In still another variation of this embodiment, the PDU data payload is a first PDU data payload, the MAC identifier is a first MAC identifier associated with the beacon device, and the type field is indicative of a first type field value; and the CBS includes a second PDU data payload, the second PDU data payload encodes a second MAC identifier adjacent to the type field, the type field is indicative of a second type field value, the second type field value is indicative of the beacon information being encoded in the second PDU data payload, and the second MAC identifier is associated with the asset beacon disposed proximate to the beacon device.

In yet another variation of this embodiment, the radio transceiver is a set of radio transceivers, the set of radio transceivers includes a first radio transceiver, a second radio transceiver, a third radio transceiver, and a fourth radio transceiver. The method may further comprise: receiving, by a first system on a chip (SoC) that includes the first radio transceiver and a first controller, the set of beacon information on a first radio frequency (RF) channel; receiving, by a second SoC that includes the second radio transceiver and a second controller, the set of beacon information on a second RF channel that is different from the first RF channel; receiving, by a third SoC that includes the third radio transceiver and a third controller, the set of beacon information on a third RF channel that is different from the first RF channel and the second RF channel; and transmitting, by a fourth SoC that includes the fourth radio transceiver and a fourth controller, the set of beacon information to the receiver device on a fourth RF channel that is one of: the first RF channel, the second RF channel, or the third RF channel.

In yet another embodiment, the present invention is a tangible machine-readable medium comprising instructions that, when executed, cause a machine to at least: receive a set of beacon information captured during a scan period, the set of beacon information including beacon information that is associated with an asset beacon disposed proximate to the beacon device; transmit, to a receiver device, a captured beacon stream (CBS), the CBS including a cycle of transmission loops, each transmission loop of the cycle of transmission loops includes a set of chirps, and each chirp of the set of chirps including beacon information from the set of beacon information; and transmit, to a mobile device, a waypoint beacon stream (WBS) including a protocol data unit (PDU) data payload, wherein the PDU data payload encodes a media access control (MAC) identifier adjacent to a type field indicative of a format for heartbeat data encoded in the PDU data payload.

In a variation of this embodiment, the PDU data payload may have a packet structure comprising: (i) a prefix field, (ii) a beacon data field, (iii) a minor field, and (iv) a transmission power field, the MAC identifier is encoded in the beacon data field. Moreover, the instructions, when executed, may further cause the machine to at least: transmit the packet structure to the mobile device, such that the mobile device can receive and decode the MAC identifier encoded in the beacon data field.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
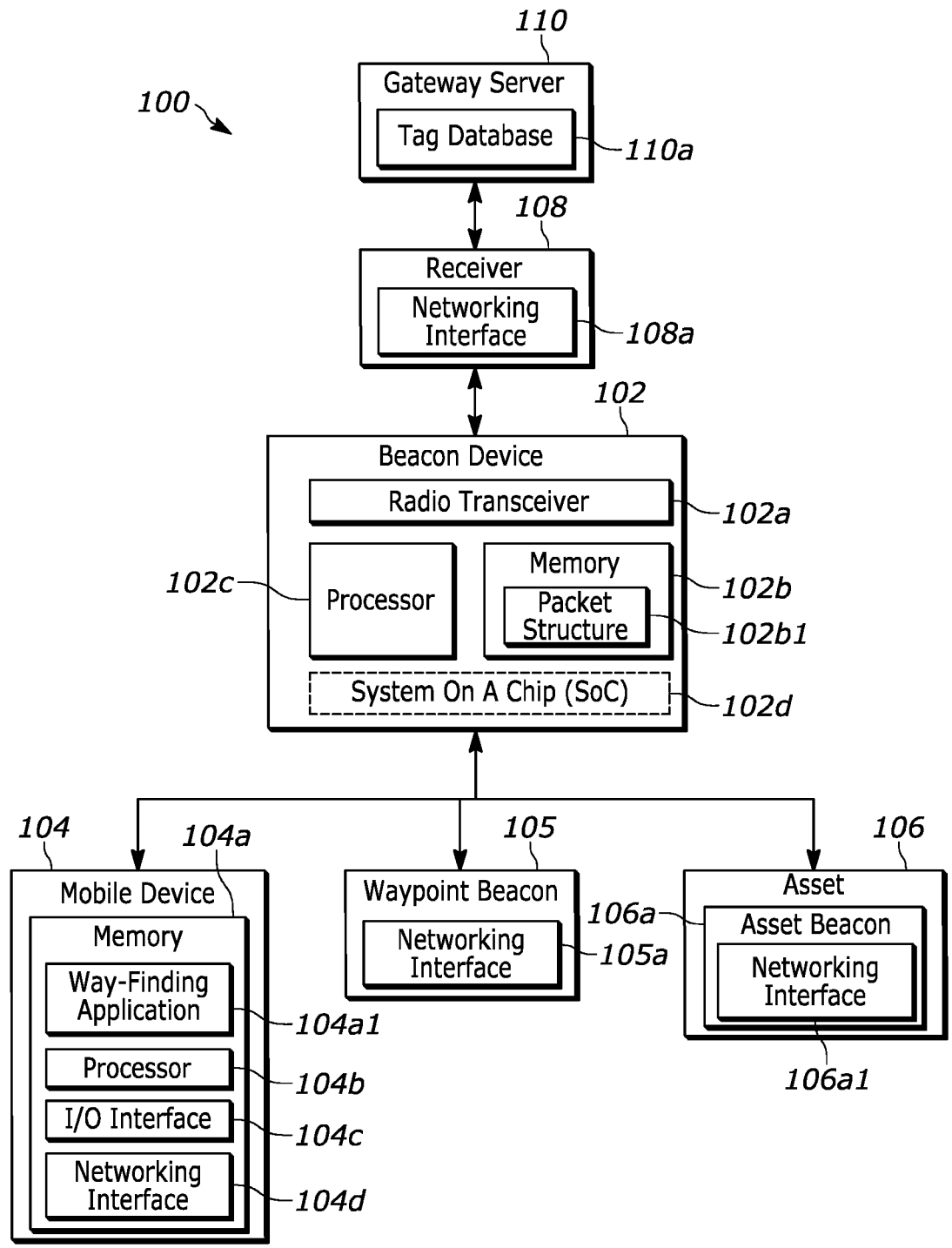
FIG. 1 depicts an example environment in which systems/devices for using separate advertisement streams in a single beacon device may be implemented, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional locationing systems suffer from a general lack of flexibility, such that users require additional hardware to achieve multiple locationing functionalities and/or are unable to use their personal devices (e.g., mobile phones) as part of the system. Many of these issues are the result of single data stream advertising conventionally performed by locationing devices (referenced herein as "beacons"). For example, a conventional beacon may advertise using a single data stream to perform a way-finding function for nearby users executing a way-finding application on their personal devices. Another conventional beacon may be configured to receive asset data, and to advertise that data using a single data stream for the locationing system to track and/or otherwise remain up-to-date regarding assets within range of the beacon. Thus, in general, conventional beacons are only capable of performing way-finding, data capture/transmission, and/or other similar functions on an individual basis.

Moreover, conventional beacon devices transmitting data to nearby devices (e.g., to support way-finding) are unable to transmit data to many user devices, such that users must purchase additional hardware to facilitate this data transmission. As an example, conventional beacon devices are unable to successfully transmit data to user devices utilizing an iBeacon beaconing mode because this protocol does not allow all types of user devices to receive/decode a media access control (MAC) identifier (ID) of the transmitting device. If a user has a user device that utilizes such an iBeacon beaconing mode (e.g., an iPhone), then the user must purchase and/or otherwise use a different device that does not utilize the iBeacon beaconing mode to be compatible with applications that rely on an analysis of a MAC ID of the beacon device.

Overall, this lack of flexibility causes conventional beacon devices to provide inefficient and underwhelming performance, minimize the interoperability of the overall networking system, reduce the efficiency and general timeliness of information delivery between devices, and create an unsavory user experience.

Thus, it is an objective of the present disclosure to eliminate these and other problems with conventional locationing systems and beacon devices via a beacon device that may utilize separate advertisement streams. In particular, the beacon device of the present disclosure alleviates the issues present with conventional systems/devices by performing multiple locationing services (e.g., way-finding, asset data capture, etc.) in separate advertisement streams with a custom data packet structure. The beacon device of the present disclosure may also seamlessly interoperate with any user device due to the specific configuration of the data packets transmitted to the user devices. Namely, the beacon device may transmit a waypoint beacon stream (WBS) including a protocol data unit (PDU) data payload to a mobile device (e.g., a user device), wherein the PDU data payload encodes a MAC identifier adjacent to a type field indicative of a format for heartbeat data encoded in the PDU data payload.

In accordance with the above, and with the disclosure herein, the present disclosure includes improvements in computer functionality or in improvements to other technologies at least because the present disclosure describes that, e.g., locationing systems, and their related various components, may be improved or enhanced with the disclosed beacon devices and methods that provide more robust, secure, and efficient locationing services for respective users and network administrators. That is, the present disclosure describes improvements in the functioning of a beacon device itself or "any other technology or technical field" (e.g., the field of distributed/industrial locationing systems) because the disclosed beacon devices and methods improve and enhance operation of beacon devices by introducing improved data transmission across multiple advertisement streams and with a custom data packet structure to eliminate inoperability and other inefficiencies typically experienced over time by locationing systems lacking such beacon devices and methods. This improves the state of the art at least because such previous locationing systems are inefficient and non-operative with many user devices as they lack the ability for data transmission across multiple advertisement streams and a data packet structure that enables any user device to receive and decode the MAC identifier of the transmitting beacon device.

In addition, the present disclosure includes applying various features and functionality, as described herein, with, or by use of, a particular machine, e.g., a beacon device, a mobile device, an asset beacon, a receiver device, and/or other hardware components as described herein.

Moreover, the present disclosure includes specific features other than what is well-understood, routine, conventional activity in the field, or adding unconventional steps that demonstrate, in various embodiments, particular useful applications, e.g., a beacon device using separate advertisement streams that transmits a waypoint beacon stream (WBS) including a protocol data unit (PDU) data payload to a mobile device (e.g., a user device), and wherein the PDU data payload encodes a MAC identifier adjacent to a type field indicative of a format for heartbeat data encoded in the PDU data payload.

Turning to the figures, FIG. 1 depicts an example environment 100 in which systems/devices for using separate advertisement streams in a single beacon device may be implemented, in accordance with embodiments described herein. The example environment 100 may comprise, include, and/or otherwise be a part of a networking environment in which the systems/devices of the present disclosure may operate. In the example embodiment of FIG. 1, the example environment 100 includes a beacon device 102 that is communicatively coupled to a mobile device 104, a waypoint beacon 105, an asset beacon 106a disposed within and/or otherwise associated with an asset 106, a receiver 108 (also referenced herein as a "receiver device"), and a gateway server 110. Generally speaking, the beacon device 102, the mobile device 104, the waypoint beacon 105, the asset beacon 106a, the receiver 108, and/or the gateway server 110 may be capable of executing instructions to, for example, implement operations of the example methods described herein, as may be represented by the flowcharts of the drawings that accompany this description. Namely, the beacon device 102 may be connected to the mobile device 104, the waypoint beacon 105, the asset beacon 106a, the receiver 108, and/or the gateway server 110 across multiple communication channels, and may generally be configured to receive and process information received from the mobile device 104, the waypoint beacon 105, the asset beacon 106a, the receiver 108, and/or the gateway server 110.

Generally speaking, the beacon device 102 may be configured to transmit and receive data corresponding to the beacon device 102 as well as data associated with nearby beacons (e.g., asset beacon 106a, waypoint beacon 105) of various types. This dual-stream receiving and transmission functionality may enable more accurate location determinations for proximate beacons and/or assets than was achievable with conventional systems. As an example, and as discussed further herein in reference to FIGS. 2A and 2B, the beacon device 102 may listen for a proximate waypoint beacon (e.g., waypoint beacon 105), and may transmit the data received from the waypoint beacon to a receiver device (e.g., receiver 108). As another example, and as discussed further herein in reference to FIGS. 3A and 3B, the beacon device 102 may operate as a fixed listening device that listens for all assets (e.g., asset 106) within range of the device 102, and the device 102 may transmit beacon information associated with the proximate beacons to a receiver device (e.g., receiver 108). In certain embodiments, the beacon device 102 may actively perform actions related to and/or including both way-finding and asset locationing without requiring any additional configuration and/or adjustments from a user.

More specifically, the beacon device 102 may be configured to periodically listen for nearby beacons (e.g., asset beacon 106a) and broadcast both the identification for the device 102 and for any proximate beacons that were detected during a scan period to, for example, the receiver 108 in a captured beacon stream (CBS). Additionally, the beacon device 102 may be configured to actively transmit identification and/or geographic information in a waypoint beacon stream (WBS) to proximate devices (e.g., mobile device 104) that may be performing a way-finding function (e.g., via way-finding application 104a1) to enable a user of the proximate device to receive location information for use in navigation, locating assets (e.g., asset 106), and/or other suitable functions or combinations thereof. In certain embodiments, the beacon device 102 may be a hybrid Bluetooth® low energy (BLE) device that communicates with some/all of the devices in the environment 100 via BLE. As a result of this active listening and transmitting, the beacon device 102 may be a key enabler for easily deployable and low-cost active radio frequency identification (RFID) location solutions.

The beacon device 102 may also include a packet structure 102b1 in the memory 102b that details the specific configuration of the custom data packets transmitted from the beacon device 102. More specifically, the packet structure 102b1 may enable, for example, the mobile device 104 and any suitable device to receive and decode a MAC identifier of the beacon device 102 when receiving communications from the beacon device 102. As an example, the mobile device 104 may receive and decode data transmissions in accordance with decoding specifications/definitions in an iBeacon beaconing mode, such that the device 104 is conventionally unable to receive and decode the MAC identifier of the beacon device 102. To overcome this issue, and as further described in reference to FIG. 2B, the beacon device 102 may transmit the packet structure 102b1 to the mobile device 104 to instruct the device 104 how to decode the MAC identifier from the custom data packets provided by the beacon device 102. Using this MAC identifier, the mobile device 104 may retrieve location information from, for example, the gateway server 110.

The beacon device 102 may also include a radio transceiver 102a configured to transmit/receive data streams (e.g., CBS, WBS) to/from various devices of the example environment 100. The radio transceiver 102a may include an antenna with an associated gain profile corresponding to the transceiver's 102a antenna converting input power into radio waves (e.g., transmission) and/or received radio waves into electrical power (e.g., receiving). In certain embodiments, the radio transceiver 102a may transmit each of the CBS and the WBS at a particular antenna gain profile, such that each data stream may reach the desired devices (e.g., mobile device 104, asset beacon 106a, receiver 108). For example, the radio transceiver 102a may be configured to transmit the CBS with a first predefined antenna gain profile that enables the CBS to reach the receiver 108, and to transmit the WBS with a second predefined antenna gain profile that is different from the first predefined antenna gain profile and that enables the WBS to reach any surrounding devices (e.g., mobile device 104).

The beacon device 102 may optionally include a system on a chip (SoC) 102d. The SoC 102d may include one or more radio transceivers (not shown) and/or a controller to independently receive/transmit and interpret communications without requiring instruction execution from the processor 102c and/or reception/transmission of communications through the radio transceiver 102a. Such an SoC 102d may utilize a dedicated advertisement channel over which communications/signals are sent/received and/or the SoC 102d may utilize a rotating set of advertising channels. Moreover, the SoC 102d may include one or more SoCs, such that, in certain embodiments, the beacon device 102 may receive/transmit and interpret communications/signals through multiple independent SoCs using dedicated or rotating advertising channels.

The mobile device 104 may be any suitable device that a user may use, for example, to execute a way-finding application 104a1. In particular, the mobile device 104 may be or include a mobile phone (e.g., a smartphone), a laptop, a tablet, a smartwatch, smart glasses, and/or any other suitable computing device or combinations thereof that is capable of communicating with the beacon device 102. The mobile device 104 includes a memory 104a, one or more processors 104b, an input/output (I/O) interface 104c, and a networking interface 104d. The memory 104a includes a way-finding application 104a1, which may generally include executable instructions, that when executed by the one or more processors 104b, cause the mobile device 104 to perform various actions that enable a user of the mobile device 104 to receive location information as a result of data obtained from the beacon device 102 corresponding to a current location of the user while the user is within range of the device 102.

The memory 104a may also store an operating system (OS) (e.g., Microsoft Windows, Linux, Unix, etc.) capable of facilitating the functionalities, apps, methods, or other software as discussed herein. Additionally, or alternatively, the way-finding application 104a1 may also be stored in an external database (e.g., gateway server 110), which is accessible or otherwise communicatively coupled to the mobile device 104. For example, at least some of the applications, software components, or application programming interfaces (APIs) may be, include, otherwise be part of, a particular application, such as the way-finding application 104a1, where each may be configured to facilitate their various functionalities discussed herein. It should be appreciated that one or more other applications may be envisioned that are executed by the one or more processors 104b.

The I/O interface 104c may include or implement operator interfaces configured to present information to an administrator, user, or operator and/or receive inputs from the administrator, user, or operator. An operator interface may provide a display screen (e.g., via the mobile device 104) which a user/operator may use to visualize any images, graphics, text, data, features, pixels, and/or other suitable visualizations or information. For example, the mobile device 104 may comprise, implement, have access to, render, or otherwise expose, at least in part, a graphical user interface (GUI) for displaying images, graphics, text, data, features, pixels, and/or other suitable visualizations or information on the display screen. The I/O interface 104c may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the mobile device 104. According to some embodiments, an administrator or user/operator may access the mobile device 104 to initiate way-finding through the way-finding application 104a1, review location information from the way-finding application 104a1, make changes, input responses and/or selections, and/or perform other functions.

The waypoint beacon 105 may generally be a fixed beacon that is configured to define a geographical location by transmitting information corresponding to the beacon 105 to proximate beacons and/or other devices. This transmitted information may include, for example, an identification tag corresponding to the beacon 105, and a proximate device (e.g. mobile device 104) may utilize this identification tag to retrieve location information from a server and/or other database (e.g., gateway server 110) that may include a location associated with the identification tag of the beacon 105.

The asset 106 may generally be any device, component, or object that an entity may desire to track and/or otherwise locate. For example, the asset may be large and calibrated tools used in and/or for oil and gas equipment/operations, parcels for delivery by a shipping company, hospital equipment that is and/or may be moved to different floors/rooms, and the like. The asset 106 may also include an asset beacon 106a that may be configured to transmit information associated with the asset beacon 106a via the networking interface 106a1 to, for example, the beacon device 102.

The receiver 108 may generally be a device configured to receive data from beacon devices (e.g., beacon device 102) and/or assets (e.g., asset 106) and to transfer this data to an external/gateway server (e.g., gateway server 110). For example, the receiver 108 may be a device that executes and/or conforms to any suitable software operating system (e.g., Android, iOS), a custom Internet of Things (IoT) bridge device with a BLE radio, and/or any other suitable device or combination thereof. The receiver 108 may also have a networking interface 108a which may enable the receiver 108 to communicate with the beacon device 102 and the gateway server 110 using any suitable communication protocol (e.g., Wi-Fi, LTE, 3G, etc.).

As previously mentioned, the gateway server 110 may generally include a tag database 110a of associations between beacon identification tags and locations, such that when the receiver 108 forwards an identification tag to the server 110, the server 110 may store/associate a location for the asset associated with the identification tag based on the device from which the identification tag is received (e.g., beacon device 102). For example, the beacon device 102 may transmit a captured asset beacon identification tag to the receiver 108, which may forward the tag to the gateway server 110. The gateway server 110 may query the tag database 110a to find an entry corresponding to the captured asset beacon identification tag. When the server 110 locates a matching entry, the server 110 may store/update the location stored in the entry to reflect the captured asset's proximity to the beacon device 102 and/or forward the location to an appropriate connected device to facilitate tracking the captured asset.

As an example, a workstation (not shown) may be communicatively connected to the gateway server 110, and a user/operator may access the gateway server 110 to retrieve a location associated with a captured asset (e.g., mobile device 104, asset 106). The workstation may query the gateway server 110 with the identification tag of the corresponding captured asset, and the gateway server 110 may match the identification tag with a location entry associated with a proximate beacon (e.g., beacon device 102). The gateway server 110 may then forward the location entry to the workstation for viewing by the user/operator.

As another example, devices using the beacon device 102 for way-finding functionality may query the gateway server 110 directly (or through the receiver 108) to retrieve the location corresponding to the beacon device 102. In particular, the mobile device 104 may receive a waypoint beacon stream (WBS) from the beacon device 102, and as a result, may receive an identification tag (e.g., a MAC ID) of the beacon device 102. The mobile device 104 may then directly/indirectly query the gateway server 110 by, in part, transmitting the identification tag of the beacon device 102 to the server 110. The gateway server 110 may retrieve a location associated with the identification tag of the beacon device 102, and may forward the location to the mobile device 104 for use in the wayfinding application 104a1.

More generally, each of the one or more memories 102b, 104a may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., way-finding application 104a1 and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 102c, 104b (e.g., working in connection with a respective operating system in the one or more memories 102b, 104a) to facilitate, implement, or perform the machine readable instructions, methods, processes, elements or limitations, as illustrated, depicted, or described for the various flowcharts, illustrations, diagrams, figures, and/or other disclosure herein.

In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.). Moreover, the one or more memories 102b, 104a may also store machine readable instructions, including any of one or more application(s), one or more software component(s), and/or one or more APIs, which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 102c, 104b may be connected to the one or more memories 102b, 104a via a computer bus responsible for transmitting electronic data, data packets, or otherwise electronic signals to and from the one or more processors 102c, 104b and one or more memories 102b, 104a to implement or perform the machine readable instructions, methods, processes, elements or limitations, as illustrated, depicted, or described for the various flowcharts, illustrations, diagrams, figures, and/or other disclosure herein.

The one or more processors 102c, 104b may interface with the one or more memories 102b, 104a via the computer bus to execute any suitable application (e.g., way-finding application 104a1) or executable instructions necessary to perform any of the actions associated with the methods of the present disclosure. The one or more processors 102c, 104b may also interface with the one or more memories 102b, 104a via the computer bus to create, read, update, delete, or otherwise access or interact with the data stored in the one or more memories 102b, 104a and/or external databases (e.g., a relational database, such as Oracle, DB2, MySQL, or a NoSQL based database, such as MongoDB). The data stored in the one or more memories 102b, 104a and/or an external database may include all or part of any of the data or information described herein, including, for example, captured beacon information/data, MAC identifier(s), heartbeat data, and/or other suitable information or combinations thereof from a CBS, a WBS, and/or any other suitable stream or source.

The radio transceiver 102a and the networking interfaces 104d, 105a, 106a1, 108a may be configured to communicate (e.g., send and receive) data via one or more external/network port(s) to one or more networks or local terminals, as described herein. In some embodiments, radio transceiver 102a and/or the networking interfaces 104d, 105a, 106a1, 108a may include a client-server platform technology such as ASP.NET, Java J2EE, Ruby on Rails, Node.js, a web service or online API, responsive for receiving and responding to electronic requests. The radio transceiver 102a and/or the networking interfaces 104d, 105a, 106a1, 108a may implement the client-server platform technology that may interact, via the computer bus, with the one or more memories 102b, 104a (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the radio transceiver 102a and the networking interfaces 104d, 105a, 106a1, 108a may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a network. In some embodiments, the network (not shown) may comprise a private network or local area network (LAN). Additionally, or alternatively, the network may comprise a public network such as the Internet. In some embodiments, the network may comprise routers, wireless switches, or other such wireless connection points communicating to beacon device 102 (via the radio transceiver 102a), the mobile device 104 (via networking interface 104d), the waypoint beacon 105 (via networking interface 105a), the asset beacon 106a (via networking interface 106a1), and the receiver 108 (via networking interface 108a) via wireless communications based on any one or more of various wireless standards, including by non-limiting example, a BLUETOOTH standard (e.g., BLE), IEEE 802.11a/b/c/g (WIFI), or the like.

Figure 2A:
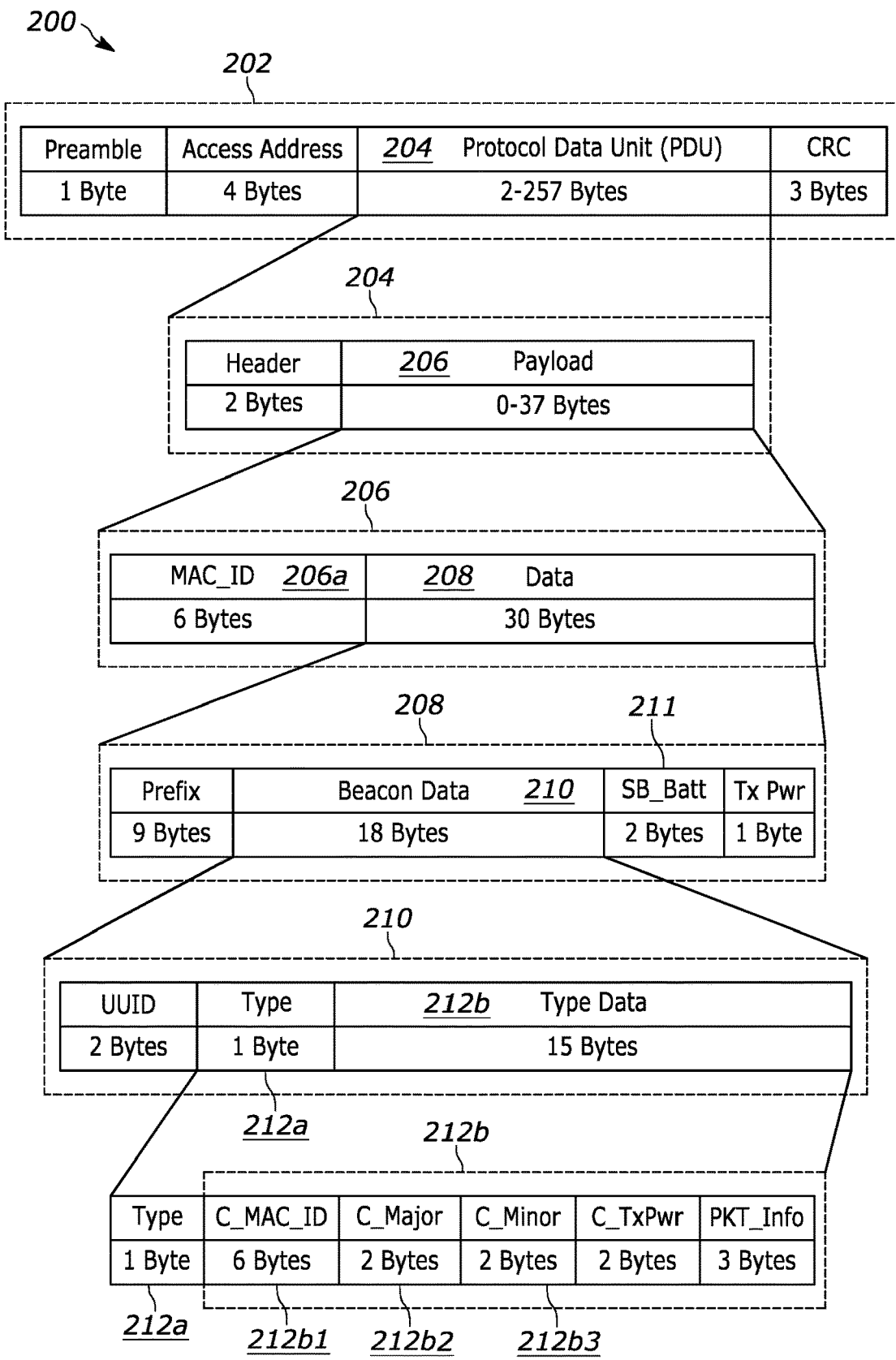
FIG. 2A depicts a data packet structure that may be used for separate advertisement streams in a single beacon device, in accordance with embodiments described herein.

FIG. 2A depicts a data packet structure 200 that may be used for separate advertisement streams in a single beacon device (e.g., beacon device 102), in accordance with embodiments described herein. In certain embodiments, the data packet structure 200 may represent the packet structure 102b1 stored in memory 102b of the beacon device 102 of FIG. 1. More generally, the data packet structure 200 may represent a digital organization of data within a signal/communication/transmission sent across a network, such as a BLE network. Devices receiving such transmissions may interpret the data packet in accordance with the structure 200 to accurately interpret the data contained therein.

The data packet structure 200, at the broadest level, is a BLE packet 202 that includes multiple data fields that each correspond to particular types of data. The BLE packet 202 may also be referenced herein as an "advertisement packet". As illustrated in FIG. 2A, the BLE packet 202 may encode data into a preamble, an access address, a protocol data unit (PDU) 204, and a cyclic redundancy check (CRC) field. Each of these data fields may have a dedicated size corresponding to the amount of data included in each data field. For example, the preamble may be a one-byte field, the access address may be a four-byte field, the PDU 204 may be a two to 257-byte field, and the CRC field may be a three-byte field. In certain embodiments, the PDU 204 may be 39 bytes.

The PDU 204 encodes data into two subfields. In particular, the PDU 204 encodes a two-byte header and a payload 206. The payload 206 may include anywhere from zero to 37 bytes of data, depending on, for example, the information captured by the beacon device (e.g., beacon device 102) for transmission to a receiver device (e.g., receiver 108). The payload 206 may further encode two subfields, including a six-byte MAC ID 206a and a 30-byte payload data field 208.

Typically, this six-byte MAC ID 206a is inaccessible under certain beaconing modes (e.g., iBeacon) as a security protocol, and as a result, the MAC ID of the transmitting beacon device is similarly inaccessible. Due to this security protocol enforced by such modes, many standard mobile/user devices (e.g., mobile device 104) are unable to receive and decode MAC IDs of proximate waypoint beacons, and are therefore unable to effectively perform way-finding when some/many/most waypoint beacons proximate to the mobile devices adhere to this conventional BLE payload data format. A common technique to avoid such issues in these beaconing modes is relying on major/minor field values to identify proximate beacons, but this technique suffers from a general lack of feasibility. In particular, provisioning of the major/minor fields for this purpose must be performed manually for each individual beacon, and is accordingly infeasible for many enterprise scale applications that may include hundreds/thousands of beacons.

However, the advertisement packet 202 eliminates this issue caused by such beaconing modes as the payload data field 208 is configured in a manner that enables any device to receive and decode the MAC ID of the beacon. The MAC ID is generally assigned/provisioned during manufacturing, such that each beacon already has a MAC ID at the time the beacon is integrated into a network without requiring any additional provisioning. Thus, the particular configuration of the payload data field 208, as described herein, enables devices to interoperate with beacons deployed as part of a network without requiring any manual intervention.

With continued reference to FIG. 2A, the payload data field 208 may encode data into a nine-byte prefix field, an eighteen-byte beacon data field 210, a two-byte minor field 211, and a one-byte transmission power field. The beacon data field 210 is configured to encode/forward information/data regarding an asset (e.g., asset 106) or a waypoint beacon (e.g., waypoint beacon 105), from which, the beacon has received the information/data. This beacon data field 210 may also encode various commands, such as control commands, status commands, or the like. Further, the minor field 211 may encode (i) a current version of operating software for the transmitting beacon device, (ii) channel information corresponding to the advertising channel across which the advertisement packet 200 is transmitted, and/or (iii) a battery life of the transmitting beacon device (as shown in FIG. 2A). The transmitting beacon device may generally be the beacon device (e.g., beacon device 102) from which the data included in the advertisement packet 202 is transmitted.

In many conventional beaconing modes, such as iBeacon or MPACT, a BLE packet may conform to a standard BLE payload data format where the beacon data field 210 may instead be a major field and a universally unique identifier (UUID) field, and the BLE packet encodes information into a prefix, the UUID field, the major field, a minor field, and a transmission power field. Moreover, in these conventional BLE payload data formats and as previously mentioned, the MAC ID of any transmitting beacon device may be encoded in the major/minor fields of the BLE packet. However, in the advertisement packet 202, the beacon data field 210 replaces and/or reorganizes these conventional fields in a manner configured to enable any device to receive and decode the MAC ID of the beacon. More specifically, the beacon data field 210 may encode data into a two byte UUID field, a one-byte type field 212a, and a fifteen-byte type data field 212b.

The data encoded in the type field 212a may generally indicate the type of data contained in the type data field 212b, and as such, may generally precede the type data field 212b. For example, the type field 212a may encode a value indicating that the type data field 212b encodes information regarding a captured beacon (e.g., asset beacon 106a, waypoint beacon 105), and the type data field 212b may encode information regarding the captured beacon. As another example, the type field 212a may encode a value indicative of a format of heartbeat data encoded in the type data field 212b and/or that the type data field 212b encodes information regarding the heartbeat of a transmitting beacon device (e.g., beacon device 102), and the type data field 212b may encode information regarding a heartbeat of the transmitting beacon device. These values of the type field 212a may be encoded as a hexadecimal value and/or any other suitable value, such as 0x00 for the first above example or 0x01/0x02 for the second above example.

The type data field 212b may generally encode information related to and/or otherwise associated with captured beacon devices, a transmitting beacon device, calibration information, and/or any other suitable information or combinations thereof. For example, and as discussed further herein in reference to FIGS. 3A and 3B, the type data field 212b may encode information about captured beacons which the transmitting beacon device (e.g., beacon device 102) heard from an asset beacon or a waypoint beacon during a scan period. In any event, the transmitting beacon device may encode this received data into the type data field 212b for transmission to a receiver device (e.g., receiver 108). As another example, the type data field 212b may encode information regarding a heartbeat of the transmitting beacon device (e.g., beacon device 102), which may generally indicate the health of the transmitting beacon device as it relates to a remaining battery life of the transmitting beacon device and that the transmitting beacon device continues to function appropriately.

More specifically, the type data field 212b may encode data into five subfields organized in a manner that may enable any device to receive and decode the MAC ID of the transmitting beacon device. The type data field 212b includes a six-byte MAC ID 212b1, a two-byte major field 212b2, a two-byte minor field 212b3, a two-byte transmission power field, and a three-byte packet information field. The MAC ID 212b1 may be a MAC ID corresponding to a captured beacon or a MAC ID of the transmitting beacon device based on the advertisement stream in which the advertisement packet 200 is transmitted. For example, if the transmitting beacon device is transmitting a WBS to enable mobile device (e.g., mobile device 104) users to perform way-finding, then the MAC ID 212b1 may be the MAC ID of the transmitting beacon device. As another example, if the transmitting beacon device is transmitting a CBS to enable asset tracking and/or other location services regarding assets, then the MAC ID 212b1 may be the MAC ID of the captured beacon associated with the asset.

In the configuration illustrated in FIG. 2A, the MAC ID 212b1 is encoded in the advertisement packet 202 adjacent to the type field 212a and outside of any major or minor fields, such that the two-byte major and minor fields 212b2, 212b3 may be available to a user for a specific use-case. As previously mentioned, such a configuration differs from conventional BLE payload data formats, and can thereby eliminate the inability of mobile devices to perform way-finding when utilizing certain protocols that conventionally disable access to and/or otherwise decoding information from the typical encoding of the MAC ID 206a. Thus, the advertisement packet 202 encodes the MAC ID 212b1 of the transmitting beacon device for transmission as part of a WBS in a manner that enables any device to receive and decode the MAC ID of the transmitting beacon device by encoding the MAC ID 212b1 in the manner illustrated in FIG. 2A and as described herein.

Figure 2B:
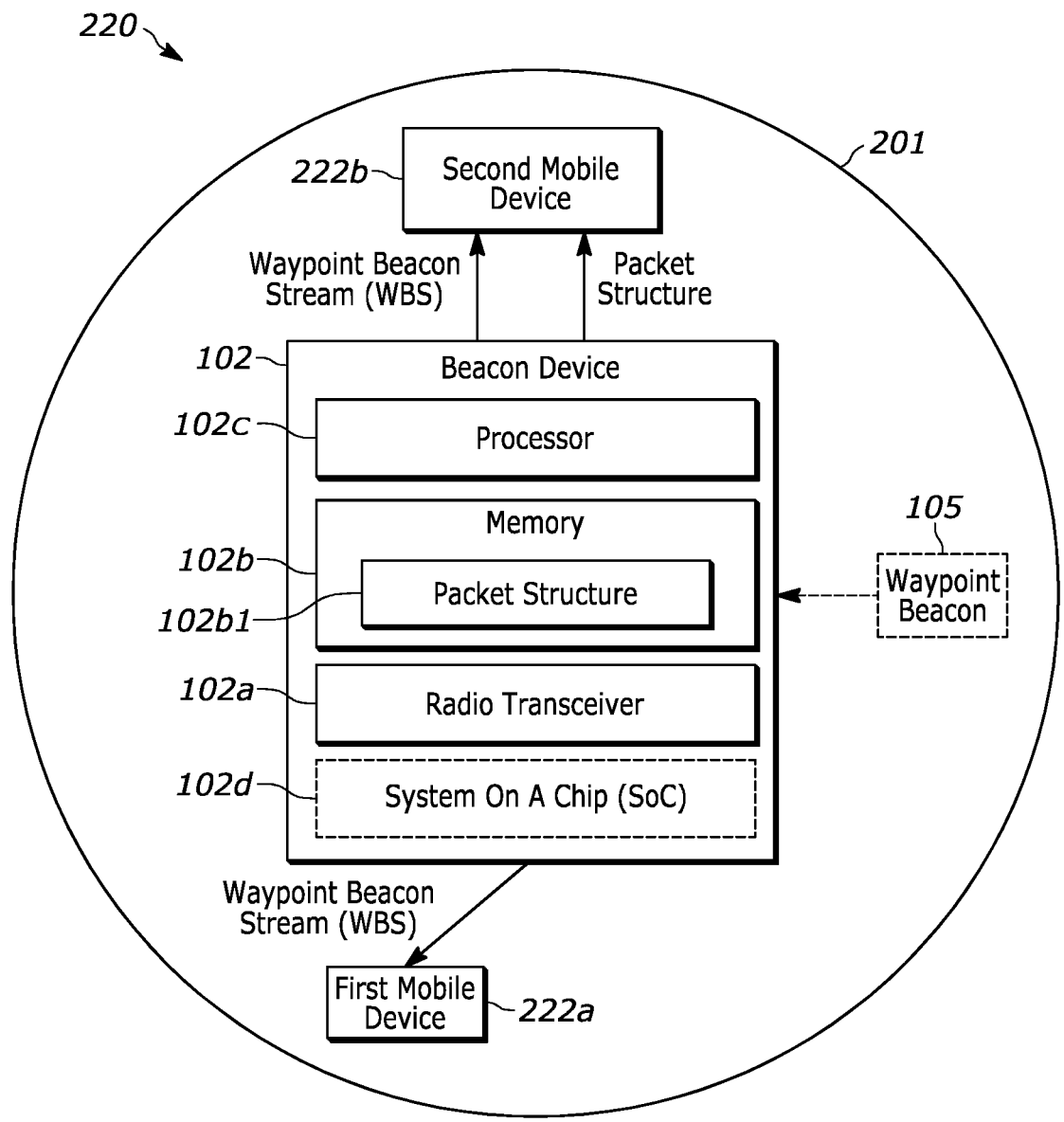
FIG. 2B depicts a beacon device transmitting a waypoint beacon stream (WBS) and a packet structure to mobile devices within range of the beacon device, in accordance with embodiments described herein.

FIG. 2B depicts a beacon device 102 transmitting a waypoint beacon stream (WBS) to a first mobile device 222a, and transmitting a WBS and a packet structure to a second mobile device 222b within range of the beacon device 102, in accordance with embodiments described herein. Generally speaking, the beacon device 102 may only transmit/receive information from devices that are within a signal range 201 of the device 102, or within signal range of a connected device, such that devices that fall outside of the signal range 201 may not transmit or receive information to/from the beacon device 102 unless the data is transmitted/received to/from an external device communicatively coupled with the beacon device 102 and the devices outside of the signal range 201. In any event, as illustrated in FIG. 2B, an exemplary way-finding scenario 220 includes the first mobile device 222a, the second mobile device 222b, and optionally, a waypoint beacon 105 within the signal range 201 of the beacon device 102.

The first mobile device 222a and the second mobile device 222b may be devices operated by users (e.g., mobile device 104) that are executing a way-finding application (e.g., way-finding application 104a1) and/or are otherwise performing way-finding as they traverse through an environment in which the beacon device 102 is disposed. For example, each of the devices in the scenario 220 may be disposed in a hospital, and the mobile devices 222a, 222b may represent devices operated by hospital staff, visitors, and/or others who are walking around the hospital trying to locate a particular room, asset, and/or other object located within the hospital.

In the exemplary way-finding scenario 220, the first mobile device 222a may be a device that operates in conformance with a beaconing mode (e.g., Eddystone, etc.) that allows the device 222a to decode MAC IDs from conventional locations with a BLE packet (e.g., MAC ID 206a). Accordingly, the first mobile device 222a may not require receipt of the custom/unique packet structure 102b1 to determine how to receive/decode the MAC ID (e.g., MAC ID 212b1) of the beacon device 102 from the WBS. Regardless, the beacon device 102 may transmit the WBS encoded as illustrated by the data packet structure 200 of FIG. 2A to the first mobile device 222a. The first mobile device 222a may then receive the WBS from the beacon device 102, proceed to decode the MAC ID (along with the other data encoded in the WBS) from the WBS, and may transmit the MAC ID to a gateway server (e.g., gateway server 110) to retrieve location data corresponding to the beacon device 102.

However, the second mobile device 222b may be a device that operates in conformance with a beaconing mode (e.g., iBeacon, etc.) that disables the device 222b from decoding MAC IDs from conventional locations with a BLE packet (e.g., MAC ID 206a). Accordingly, the second mobile device 222b may require receipt of the custom/unique packet structure 102b1 to determine how to receive/decode the MAC ID (e.g., MAC ID 212b1) of the beacon device 102 from the WBS. The beacon device 102 may transmit the packet structure 102b1 to the second mobile device 222b, and the mobile device 222b may interpret the packet structure 102b1 to determine where the MAC ID (e.g., MAC ID 212b1) is encoded within the WBS. The second mobile device 222b may then receive the WBS from the beacon device 102, proceed to decode the MAC ID (along with the other data encoded in the WBS) from the WBS, and may transmit the MAC ID to a gateway server (e.g., gateway server 110) to retrieve location data corresponding to the beacon device 102.

In certain embodiments, the beacon device 102 may receive information/data from the waypoint beacon 105, and may transmit part/all of that information/data to the first mobile device 222a and/or the second mobile device 222b. For example, one or both of the mobile devices 222a, 222b may be within the signal range 201 of the beacon device 102, but may be outside of the signal range of the waypoint beacon 105. In this example, the beacon device 102 may forward way-finding information from the waypoint beacon 105 to the proximate mobile devices 222a, 222b as part of the WBS to facilitate the mobile devices 222a, 222b performing way-finding despite being out-of-range of the waypoint beacon 105. In this manner, the beacon device 102 may forward transmissions as part of a transmission chain (e.g., a daisy chain) between/among devices within signal range 201, and may thereby increase the effective size of waypoint device (e.g., waypoint device 105) signal ranges that are part of the locationing system in a particular environment (e.g., hospital, shipping facility, etc.).

In certain instances, the beacon device 102 may encode heartbeat data into the WBS prior to transmitting the WBS to the mobile devices 222a, 222b. As previously mentioned, this heartbeat data may indicate a general health status of the beacon device 102, such as a remaining battery life, an indication of continued functionality (e.g., ability/capacity to receive/transmit signals at particular signal strengths), and/or other suitable data corresponding to the general health/functionality of the beacon device 102. Thus, the beacon device 102 may encode the heartbeat data into the WBS and transmit the WBS to the mobile devices 222a, 222b. In this manner, the mobile devices 222a, 222b and the general network (e.g., environment 100) may receive periodic updates on the status of the beacon device 102 to remain up-to-date in the event that the health status of the beacon device 102 begins to deteriorate for any reason. If, for example, the beacon device 102 transmits the WBS to the mobile device 222a, and the heartbeat data indicates that the device 102 has a low battery, the mobile device 222a may notify a user of the device and/or other network components (e.g., gateway server 110) to schedule a battery replacement for the device 102 to avoid unnecessary and/or extended loss of locationing functionality.

However, as previously mentioned, the beacon devices (e.g., beacon device 102) of the present disclosure may capture data/information from various proximate devices as well as transmit data to those devices for way-finding applications. This data capturing from proximate devices generally corresponds to location services associated with those proximate devices, such as tracking locations of assets (e.g., asset 106) associated with the proximate devices (e.g., asset beacon 106a). To perform such data capture, the beacon devices of the present disclosure periodically perform multiple functions as part of a cycle period. In particular, and as discussed below in reference to FIG. 3A, the beacon devices of the present disclosure may advertise a CBS during a cycle period consisting of a scan period and a beaconing period.

Figure 3A:
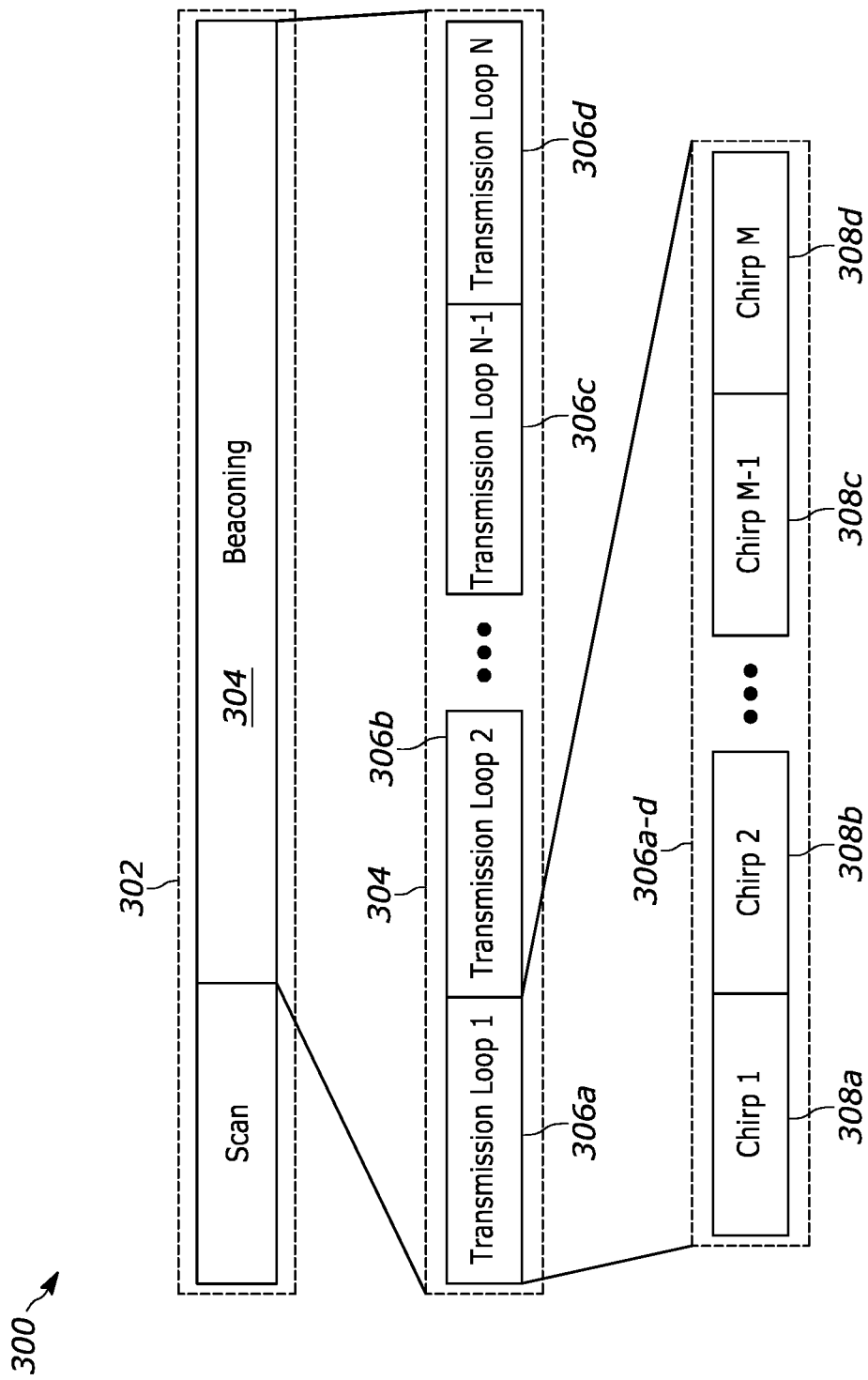
FIG. 3A depicts a cycle period structure for a beacon device transmitting a captured beacon stream (CBS), in accordance with embodiments described herein.

To illustrate, FIG. 3A depicts a cycle period structure 300 for a beacon device (e.g., beacon device 102) transmitting a captured beacon stream (CBS), in accordance with embodiments described herein. Generally, the cycle period structure 300 of FIG. 3A includes a cycle period 302, a beaconing period 304, and transmission loops 306a-d. However, at the broadest level, the cycle period 302 includes a scan time and the beaconing period 304. During the scan time, the beacon device may listen for other proximate beacons to receive data from the proximate beacons. When the scan time for the beacon device is concluded, the beacon device may enter the beaconing period 304, during which, the beacon device may transmit advertisement packets using a suitable advertisement stream (e.g., CBS) that may, for example, include the unique/custom packet structure (e.g., packet structure 102b1) described herein.

The cycle period 302 may be defined roughly as the time from the beginning/initiation of a scan by the beacon device until the beginning/initiation of a subsequent scan by the beacon device. For example, the cycle period 302 may be five minutes in length, ten minutes in length, and/or any other suitable duration of time. The scan time may only account for a small percentage of the time defining the cycle period 302. For example, if the cycle period 302 is five minutes in length, then the scan time may be approximately five seconds, and the beaconing period 304 may account for the remaining four minutes and fifty-five seconds of the cycle period 302.

A reason for this time differential between the scan time and the beaconing period 304 is that scanning/listening for proximate beacons is power consuming, such that minimizing the scan time is an important consideration to lengthen the battery life of the beacon device. Determining a time period of the scan time is also influenced by the chirp time of any proximate devices the beacon device may hear. Typically, asset beacons (e.g., asset beacon 106a) and waypoint beacons (e.g., waypoint beacon 105) may have a standard chirp time, during which, the beacons output an advertisement packet across three advertisement channels. The chirp time may generally be the time between a beacon transmission on a single advertisement channel (e.g., 37, 38, 39) and the next beacon transmission on that same channel. The chirp may be the transmission period, during which, the beacon outputs the advertisement packet; and the chirp may include sending an advertisement packet on any suitable number of advertisement channels (e.g., one, two, or three advertisement channels).

More specifically, asset and waypoint beacons may sleep for the majority of their chirp time, and may only transmit advertisement packets during a small portion of the chirp time. As an example, if a chirp time of a beacon is two seconds, then the sleep time of that beacon may last 1.995 seconds, and the beacon may output an advertisement packet across three advertisement channels for the remaining approximately five milliseconds (e.g., a transmission period). The three advertisement channels may generally be radio frequency channels, and may include channels 37, 38, and 39, which may be approximately 2402 megahertz (MHz), 2426 MHz, and 2480 MHz, respectively. Further, to avoid collisions between/among transmitted signals on identical advertisement channels and having multiple beacons advertising in synchronization, each beacon device may dither its respective chirp times randomly in addition to changing the order of the advertisement channels on which the packets are transmitted.

With this example chirp time in mind, the scan time of the cycle period 302 may generally be at least 2.2 seconds (or greater than two seconds) to ensure that each proximate beacon may transmit an advertisement packet for receipt by the beacon device during the scan time and that the beacon device may have an opportunity to receive the packet. However, even such an appropriately timed scan time may result in the beacon device missing transmissions from proximate beacons due to several other factors. For example, the beacon device generally rotates through the three advertisement channels during the scan time to attempt to receive transmissions on each of the channels during each cycle period 302, such that the scan time is divided among each of the channels. Additionally, channel interference may cause transmissions on a particular advertisement channel to fail to reach the beacon device during the scan time or to be uninterpretable by the beacon device upon receipt. In all, these multiple considerations may cause a user to change the scan time and/or the cycle period 302 length to increase the likelihood of successful beacon captures while simultaneously balancing the battery life of the beacon device.

In any event, when the beacon device enters the beaconing period 304, the beacon device may generally output a series of advertisement packets for receipt by, for example, a receiver device (e.g., receiver 108). More specifically, the beaconing period 304 may be broken down into multiple transmission loops 306a-d that may be repeated cyclically during each beaconing period 304. For example, during a first beaconing period, the cycle of transmission loops 306a-d may be transmitted by the beacon device in an order defined by transmission loop 1 306a being transmitted first, transmission loop 2 306b being transmitted second, and so on until transmission loop N 306d is transmitted last at the end of the beaconing period 304. The length of each transmission loop 306a-d may be identical during each respective beaconing period 304, and may be based on the amount of beacon information included in a set of beacon information that the beacon device has captured during the preceding scan time.

The set of beacon information included in each transmission loop 306a-d may be more specifically included in a set of chirps that comprise each transmission loop 306a-d. These chirps may generally correspond to the chirps previously described, where the beacon device sleeps for a majority of the chirp time and transmits an advertisement packet during a relatively short period of the chirp time. Each transmission loop 306a-d may include a set of chirps, e.g., chirp 1, chirp 2, . . . , chirp M-1, and chirp M, and each chirp may include beacon information from the set of beacon information. For example, chirp 1 may include beacon information associated with a first proximate beacon that was captured by the beacon device during the preceding scan time, and chirp 2 may include beacon information associated with a second proximate beacon that was captured by the beacon device during the preceding scan time. Each chirp may include such beacon information, and as a result, the number of chirps (e.g., M in FIG. 3A) included in the set of chirps may be any suitable number based on the number of beacons that are proximate to the beacon device and/or how much additional data the beacon may need to transmit as part of individual chirps.

Figure 3B:
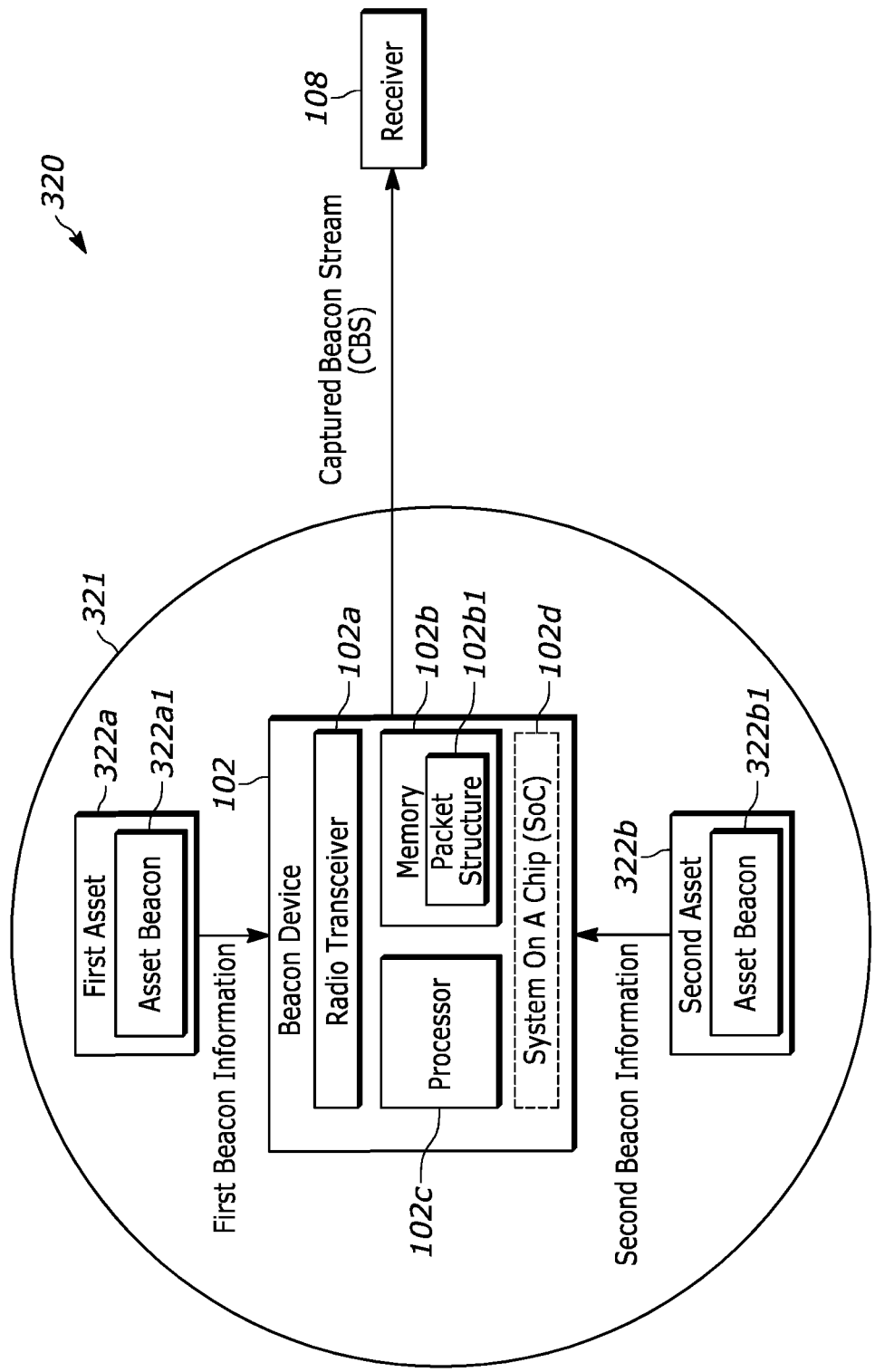
FIG. 3B depicts a beacon device receiving beacon information from multiple proximate asset beacons and transmitting the beacon information in a CBS to a receiver device, in accordance with embodiments described herein.

To illustrate a scenario where a beacon device may capture/transmit beacon information as described in FIG. 3A, FIG. 3B depicts an example scenario 320 where the beacon device 102 receives beacon information from multiple proximate asset beacons 322a, 322b and transmits the beacon information in a CBS to a receiver device 108, in accordance with embodiments described herein. As illustrated in FIG. 3B, the beacon device 102 has two assets 322a, 322b within signal range 321 of the beacon device 102, such that the beacon device 102 may receive beacon information from the respective asset beacons 322a1, 322b1.

In particular, the beacon device 102 may receive first beacon information from the first asset beacon 322a1, and may receive second beacon information from the second asset beacon 322b1. The first beacon information may generally include an identification tag associated with the first asset beacon 322a1 and/or information identifying and/or otherwise associated with the first asset 322a. The second beacon information may generally include an identification tag associated with the second asset beacon 322b1 and/or information identifying and/or otherwise associated with the second asset 322b.

For example, the beacon device 102 may be located in a first hospital room, the first asset 322a may be a piece of medical equipment located in the first hospital room, and the second asset 322b may be another piece of medical equipment assigned to a second hospital room but erroneously located in the first hospital room. The second hospital room may be adjacent to the first hospital room, the second hospital room may also have a second beacon device (not shown) with a signal range (not shown), and the second asset 322b may be out of the signal range of the second beacon device. The asset beacons 322a1, 322b1 may periodically transmit advertisement packets, as described herein, that include the beacon information associated with each asset beacon 322a1, 322b1 and asset 322a, 322b, respectively.

The beacon device 102 may receive the first beacon information from the first asset beacon 322a1 and the second beacon information from the second asset beacon 322b1 during a scan time, and during a subsequent beaconing period (e.g., beaconing period 304) the beacon device 102 may transmit the beacon information in a CBS to the receiver 108. The receiver 108 may generally be a bridge device (e.g., a Wi-Fi bridge) and/or any other suitable receiver device that is configured to receive data streams from beacon devices and interpret/process and/or re-transmit the data streams to an appropriate location for interpretation/processing. For example, the receiver 108 may receive the CBS from the beacon device 102, and may proceed to transmit at least the first beacon information and the second beacon information to a server (e.g., gateway server 110) for interpretation/processing, such as to track the locations of the first asset 322a and the second asset 322b. Of course, in certain embodiments, the receiver 108 may simply receive the data streams from the beacon device 102 without interpreting, re-transmitting, and/or otherwise processing the data streams in any manner.

In the prior example, the server (e.g., gateway server 110) may receive the first beacon information, the second beacon information, and a MAC ID of the beacon device 102. The server may then update/store location data corresponding to the beacon device 102 in entries associated with the first asset 322a and the second asset 322b. The server may also store data for each asset 322a, 322b corresponding to expected and/or acceptable locations for each asset 322a, 322b, and when the server updates/stores the location data indicating that both assets 322a, 322b are located in the first hospital room, the server may transmit an alert to a workstation (not shown) indicating that the second asset 322b is erroneously placed in the first hospital room. Thus, a user/operator using the workstation may view the alert and proceed to move the second asset 322b from the first hospital room to the second hospital room. Additionally, or alternatively, the workstation may query the tag database 110a to identify a mobile device (e.g., mobile device 104) that is located in the first or second hospital rooms and push an alert to the mobile device regarding the erroneously placed second asset 322b.

As another example, the beacon device 102 may be disposed in a manufacturing plant and configured to capture location data corresponding to oil and gas assets. In particular, the first asset 322a and the second asset 322b may be large and calibrated tools or small tools for use in the oil and gas industry within a manufacturing plant. Each asset 322a, 322b may have an individual asset beacon 322a1, 322b1, such that the beacon device 102 may track the location of the assets 322a, 322b while in signal range 321 of the device 102. As a result, the manufacturing entity is able to easily locate the tools 322a, 322b, and thereby reduce loss (e.g., loss prevention) and expenditures on tools from eliminating purchasing of duplicates. Further, the entity achieves better, more effective management of expensive, calibrated tools, improves utilization of existing toolsets, and frees up capital for other purposes.

As yet another example, the beacon device 102 may be disposed in a shipping/transportation warehouse and configured to capture data corresponding to parcels for shipment, unloading, and/or otherwise transportation. In particular, the first asset 322a and the second asset 322b may be individual parcels that are transported within the warehouse and loaded/unloaded from transportation vehicles. Each asset 322a, 322b may have an individual asset beacon 322a1, 322b1, such that the beacon device 102 may track the location of the assets 322a, 322b while in signal range 321 of the device 102. As a result, the shipping/transportation entity is able to easily locate the parcels 322a, 322b, and may solve the expensive and time-consuming problem of loading parcels onto the wrong transportation vehicle. Such improved loading efficiency provides for efficient deliveries and improved customer satisfaction with parcels delivered on time, and prevents the shipping/transportation entity from having to redirect the parcel from the incorrect truck to the correct truck.

In certain instances, the beacon device 102 may complete a scan time without capturing data from any proximate beacons/devices. In these instances, the beacon device 102 may still transmit the CBS to the receiver 108 during a subsequent beaconing period (e.g. beaconing period 304). The CBS may not encode any beacon information from captured, proximate beacons, but may encode heartbeat data associated with the beacon device 102. As previously mentioned, this heartbeat data may indicate a general health status of the beacon device 102, such as a remaining battery life, an indication of continued functionality (e.g., ability/capacity to receive/transmit signals at particular signal strengths), and/or other suitable data corresponding to the general health/functionality of the beacon device 102. Thus, the beacon device 102 may continue to transmit the CBS to the receiver 108 during each beaconing period regardless of whether the device 102 receives/captures information associated with proximate beacons/assets to transmit at least the heartbeat data of the beacon device 102. In this manner, the receiver 108 and the general network (e.g., environment 100) may receive periodic updates on the status of the beacon device 102 to remain up-to-date in the event that the health status of the beacon device 102 begins to deteriorate for any reason. If, for example, the beacon device 102 transmits the CBS to the receiver with only the heartbeat data encoded therein, and the heartbeat data indicates that the device 102 has a low battery, the receiver 108 and/or other network components may schedule a battery replacement for the device 102 to avoid unnecessary and/or extended loss of locationing functionality.

Figure 4:
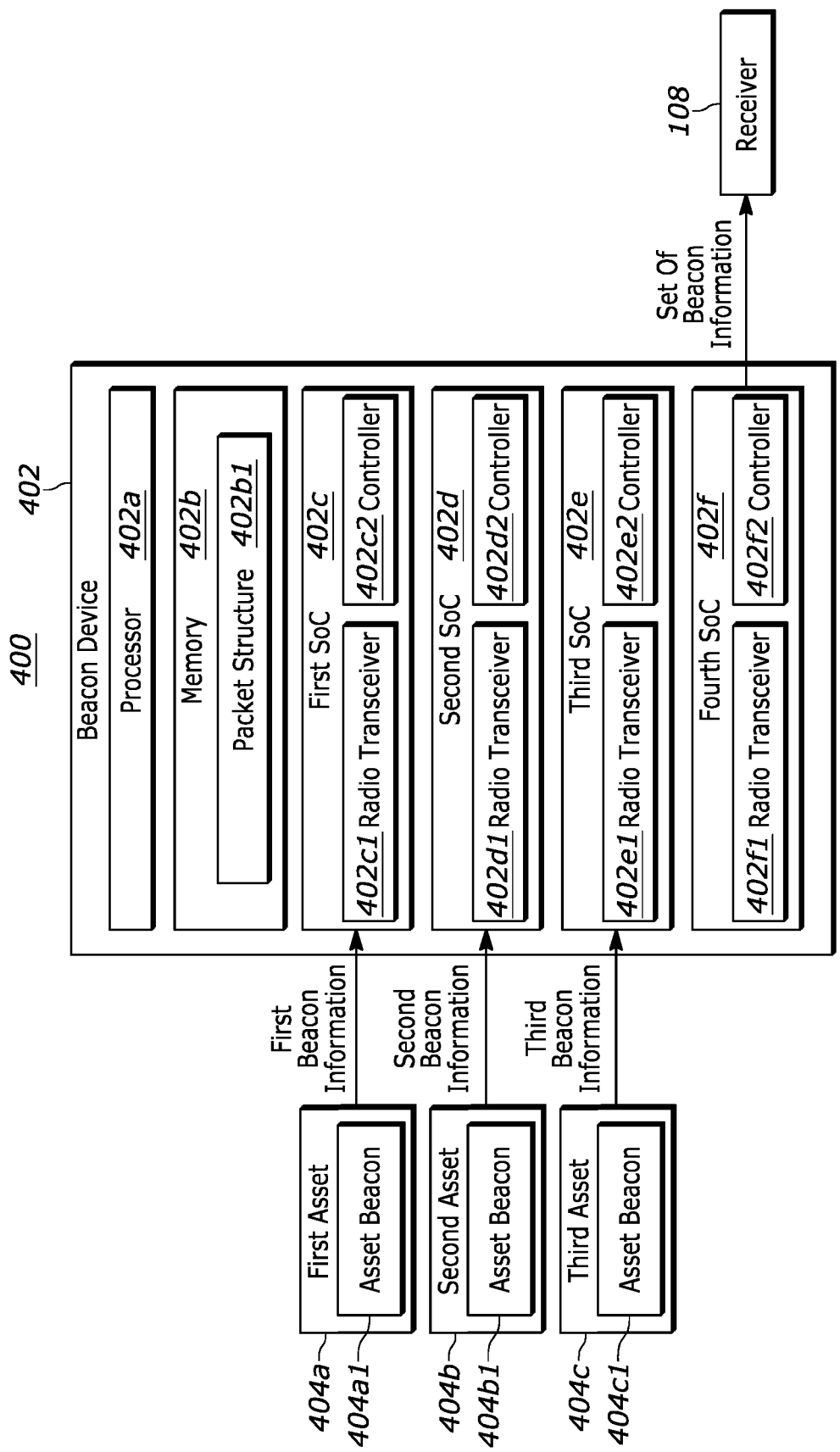
FIG. 4 depicts a beacon device with multiple systems on chips (SoCs) receiving beacon information from multiple proximate asset beacons and transmitting the beacon information to a receiver device, in accordance with embodiments described herein.

As previously mentioned, the beacon devices of the present disclosure may receive beacon information from multiple assets, and may include an SoC (e.g., SoC 102d) that is configured to receive the beacon information. In certain embodiments, and as illustrated in the example scenario 400 of FIG. 4, the beacon devices of the present disclosure may include multiple SoCs to receive beacon information across the three advertisement channels. FIG. 4 depicts a beacon device 402 with multiple systems on chips (SoCs) 402c-f where the SoCs 402c-e respectively receive beacon information from multiple proximate asset beacons 404a1, 404b1, 404c1 and transmitting the beacon information to a receiver device 108, in accordance with embodiments described herein. The beacon device 402 may include a processor 402a, a memory 402b storing a packet structure 402b1, a first SoC 402c, a second SoC 402d, a third SoC 402e, and a fourth SoC 402f. In certain embodiments, the processor 402a, the memory 402b, and the packet structure 402b1 may be the processor 102c, the memory 102b, and the packet structure 102b1 of FIG. 1, respectively. As illustrated in FIG. 4, the beacon device 402 may include four SoCs 402c-f, but it should be understood that the beacon device 402 may include more or fewer SoCs based on the requirements of the beacon device 402.

The first SoC 402c may include a radio transceiver 402c1 and a controller 402c2. The radio transceiver 402c1 and the controller 402c2 may operate in tandem to independently receive and/or interpret communications (e.g., the first beacon information) without requiring instruction execution from the processor 402a. The first SoC 402c may generally receive communications over a dedicated advertisement channel over which communications/signals are transmitted/ received (e.g., advertising channel 37, 38, and/or 39) and/or the first SoC 402c may utilize a rotating set of advertising channels.

The second SoC 402d may include a radio transceiver 402d1 and a controller 402d2. The radio transceiver 402d1 and the controller 402d2 may operate in tandem to independently receive and/or interpret communications (e.g., the second beacon information) without requiring instruction execution from the processor 402a. The second SoC 402d may generally receive communications over a dedicated advertisement channel over which communications/signals are transmitted/received (e.g., advertising channel 37, 38, and/or 39) and/or the second SoC 402d may utilize a rotating set of advertising channels.

The third SoC 402e may include a radio transceiver 402e1 and a controller 402e2. The radio transceiver 402e1 and the controller 402e2 may operate in tandem to independently receive and/or interpret communications (e.g., the third beacon information) without requiring instruction execution from the processor 402a. The third SoC 402e may generally receive communications over a dedicated advertisement channel over which communications/signals are transmitted/received (e.g., advertising channel 37, 38, and/or 39) and/or the third SoC 402e may utilize a rotating set of advertising channels.

The fourth SoC 402f may include a radio transceiver 402f1 and a controller 402f2. The radio transceiver 402f1 and the controller 402f2 may operate in tandem to independently transmit and/or interpret communications (e.g., the set of beacon information) without requiring instruction execution from the processor 402a. The fourth SoC 402f may generally receive a set of beacon information from one or more of the other SoCs 402c-e, and may generate and transmit a communication containing the set of beacon information to the receiver 108. The fourth SoC 402f may transmit communications over a dedicated advertisement channel over which communications/signals are transmitted/received (e.g., advertising channel 37, 38, and/or 39) and/or the fourth SoC 402f may utilize a rotating set of advertising channels.

As illustrated in the example scenario 400 of FIG. 4, the beacon device 402 may receive beacon information associated with three different assets 404a-c. The beacon device 402 may receive first beacon information from a first asset beacon 404a1 attached to and/or otherwise disposed on the first asset 404a, second beacon information from a second asset beacon 404b1 attached to and/or otherwise disposed on the second asset 404b, and third beacon information from a third asset beacon 404c1 attached to and/or otherwise disposed on the third asset 404c. The beacon device 402 may receive the first, second, and third beacon information at the first, second, and third SoCs 402c-d, respectively, during a scan time of a cycle period (e.g., cycle period 302). It should be appreciated that because the beacon device 402 is able to listen across all three advertisement channels simultaneously, the duration of the scan time can be reduced without significantly lowering a likelihood of detecting a transmission from an asset beacon. As described above, this reduction in scan time may significantly improve the battery life of the beacon device 402. During a subsequent beaconing period (e.g., beaconing period 304), the fourth SoC 402f may transmit the set of beacon information to the receiver 108 across one of the advertisement channels utilizing a transmission loop and chirp structure, as described in reference to FIG. 3A. The set of beacon information may include each of the first beacon information, the second beacon information, the third beacon information, as well as additional data associated with additional beacons and/or the beacon device 402 (e.g., heartbeat data).

Figure 5:
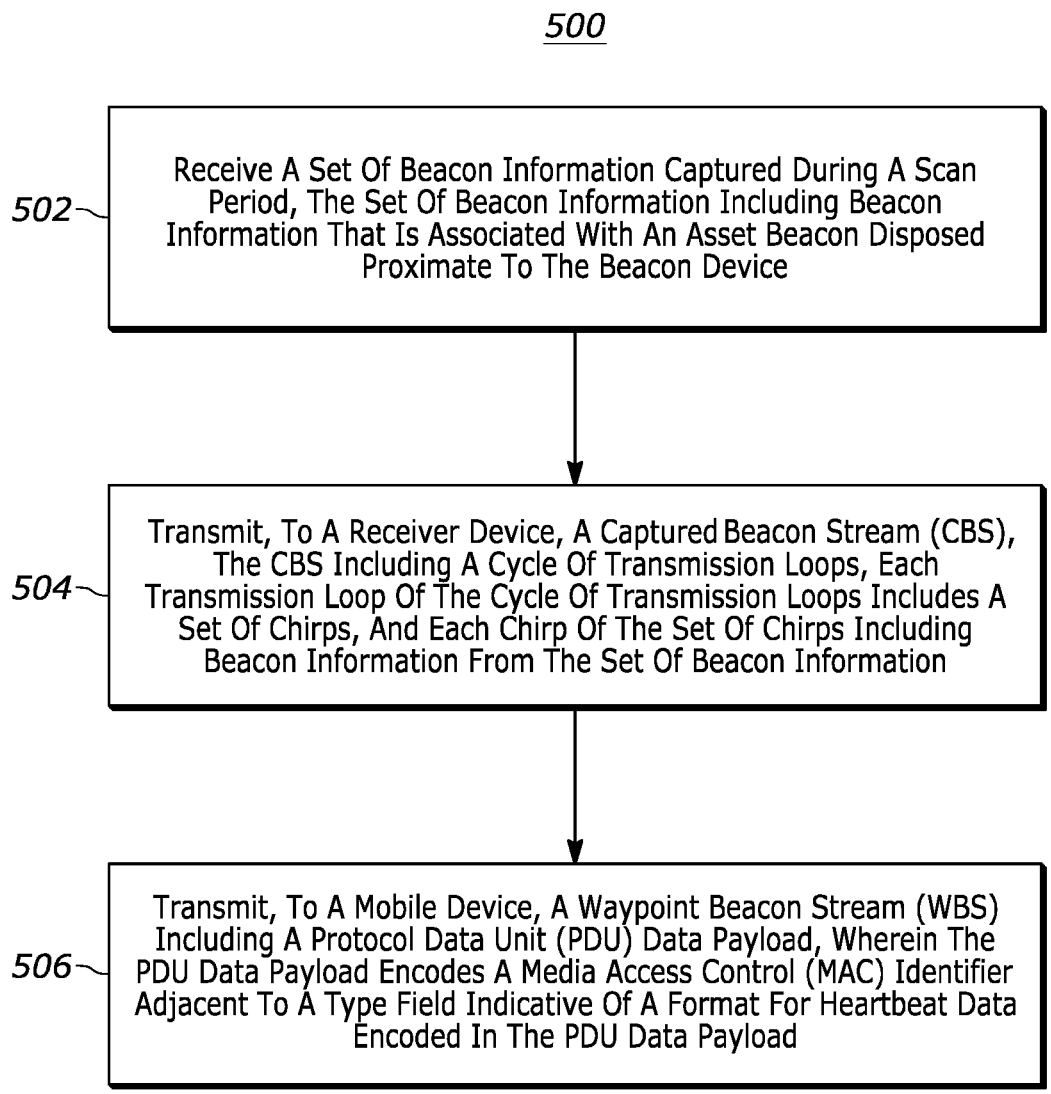
FIG. 5 is a flowchart representative of a method for using separate advertisement streams in a single beacon device, in accordance with embodiments described herein.

FIG. 5 is a flowchart representative of a method 500 for using separate advertisement streams in a single beacon device (e.g., beacon device 102), in accordance with embodiments described herein. Generally, and as described herein, the method 500 for using separate advertisement streams in a single beacon device 102 may cause the beacon device 102 to receive a set of beacon information, transmit a CBS, and transmit a WBS in a manner that enables interoperability (e.g., way-finding, asset tracking, etc.) with any device (e.g., mobile device 104, waypoint beacon 105) within range of the beacon device 102. More specifically, the method 500 enables the beacon device 102 to enhance the speed, efficiency, security, and reliability of networking data transmission across a wide variety of user devices within a networking system by providing a single beacon device capable of receiving and transmitting data associated with proximate beacons using a unique packet structure (e.g., packet structure 102b1) configured to enable all proximate devices to successfully receive and decode the beacon's MAC ID without violating security protocols of many standard beaconing modes. It is to be understood that any of the steps of the method 500 may be performed by, for example, the beacon device 102, and/or any other suitable components or combinations thereof discussed herein.

At block 502, the method 500 includes receiving, by a radio transceiver (e.g., radio transceiver 102a), a set of beacon information captured during a scan period. The set of beacon information may include beacon information that is associated with an asset beacon (e.g., asset beacon 106a) disposed proximate to the beacon device. In certain embodiments, the radio transceiver is a Bluetooth® Low Energy (BLE) radio transceiver.

At block 504, the method 500 includes transmitting, by the radio transceiver to a receiver device (e.g., receiver 108), a captured beacon stream (CBS). The CBS may include a cycle of transmission loops (e.g., transmission loops 306a-d), and each transmission loop of the cycle of transmission loops may include a set of chirps (e.g., chirp 1, chirp 2, chirp M, etc.). Further, each chirp of the set of chirps may include beacon information from the set of beacon information. In certain embodiments, the set of chirps may be sequentially identical within each transmission loop of the cycle of transmission loops. In other words, transmission loop 1 306a may have a sequence of chirps proceeding as chirp 1, chirp 2, . . . , chirp M−1, and chirp M; and each subsequent transmission loop 306b-306d may have an identical sequence of chirps proceeding as chirp 1, chirp 2, . . . , chirp M−1, and chirp M.

In some embodiments, the radio transceiver may be a set of radio transceivers. In particular, the set of radio transceivers may include a first radio transceiver (e.g., radio transceiver 402c1), a second radio transceiver (e.g., radio transceiver 402d1), a third radio transceiver (e.g., radio transceiver 402e1), a fourth radio transceiver (e.g., radio transceiver 402f1). In these embodiments, the beacon device may further comprise a first system on a chip (SoC) (e.g., first SoC 402c) that includes the first radio transceiver 402c1 and a first controller (e.g., controller 402c2), and the first radio transceiver 402c1 may be configured to receive the set of beacon information (e.g., the first beacon information) on a first radio frequency (RF) channel (e.g., advertisement channel 37). In these embodiments, the beacon device may also comprise a second SoC (e.g., second SoC 402d) that includes the second radio transceiver 402d1 and a second controller (e.g., controller 402d2), wherein the second radio transceiver 402*d*1 is configured to receive the set of beacon information (e.g., the second beacon information) on a second RF channel (e.g., advertisement channel 38) that is different from the first RF channel. In these embodiments, the beacon device may also comprise a third SoC (e.g., third SoC 402*e*) that includes the third radio transceiver 402*e*1 and a third controller (e.g., controller 402*e*2), wherein the third radio transceiver 402*e*1 is configured to receive the set of beacon information (e.g., third beacon information) on a third RF channel (e.g., advertisement channel 39) that is different from the first RF channel and the second RF channel. In these embodiments, the beacon device may also comprise a fourth SoC (e.g., fourth SoC 402*f*) that includes the fourth radio transceiver 402*f*1 and a fourth controller (e.g., controller 402*f*2), wherein the fourth radio transceiver 402*f*1 is configured to transmit the set of beacon information to the receiver device (e.g., receiver 108) on one of: the first RF channel, the second RF channel, or the third RF channel.

At block 506, the method 500 may include transmitting, by the radio transceiver to a mobile device (e.g., mobile device 104), a waypoint beacon stream (WBS) including a protocol data unit (PDU) data payload. The PDU data payload may encode a media access control (MAC) identifier adjacent to a type field indicative of a format for heartbeat data encoded in the PDU data payload. In certain embodiments, the PDU data payload may have a packet structure (e.g., packet structure 102*b*1) comprising (i) a prefix field, (ii) a beacon data field (e.g., beacon data field 210), (iii) a minor field (e.g., minor field 211), and (iv) a transmission power field, and the MAC identifier (e.g., MAC ID 212*b*1) may be encoded in the beacon data field 210. Further in these embodiments, the minor field 211 may encode (i) a current version, (ii) channel information, and (iii) a battery life, and the beacon data field 210 may be encoded by bytes assigned to a UUID field and a major field defined in an iBeacon beaconing mode. Additionally, in some embodiments, the instructions, when executed by the at least one processor, may further cause the beacon device to transmit, by the radio transceiver, the packet structure to the mobile device, such that the mobile device can receive and decode the MAC identifier encoded in the beacon data field.

In certain embodiments, the radio transceiver may be configured to transmit the CBS with a first predefined antenna gain profile, and to transmit the WBS with a second predefined antenna gain profile that is different from the first predefined antenna gain profile.

In some embodiments, the PDU data payload may be a first PDU data payload, the MAC identifier may be a first MAC identifier associated with the beacon device, and the type field may be indicative of a first type field value. Further in these embodiments, the CBS may include a second PDU data payload, such that the second PDU data payload may encode a second MAC identifier adjacent to the type field. The type field may be indicative of a second type field value, and the second type field value may be indicative of the beacon information being encoded in the second PDU data payload. Additionally, the second MAC identifier may be associated with the asset beacon disposed proximate to the beacon device.

Of course, it is to be appreciated that the actions of the method 500 may be performed in any suitable order and any suitable number of times.

Figure 6:
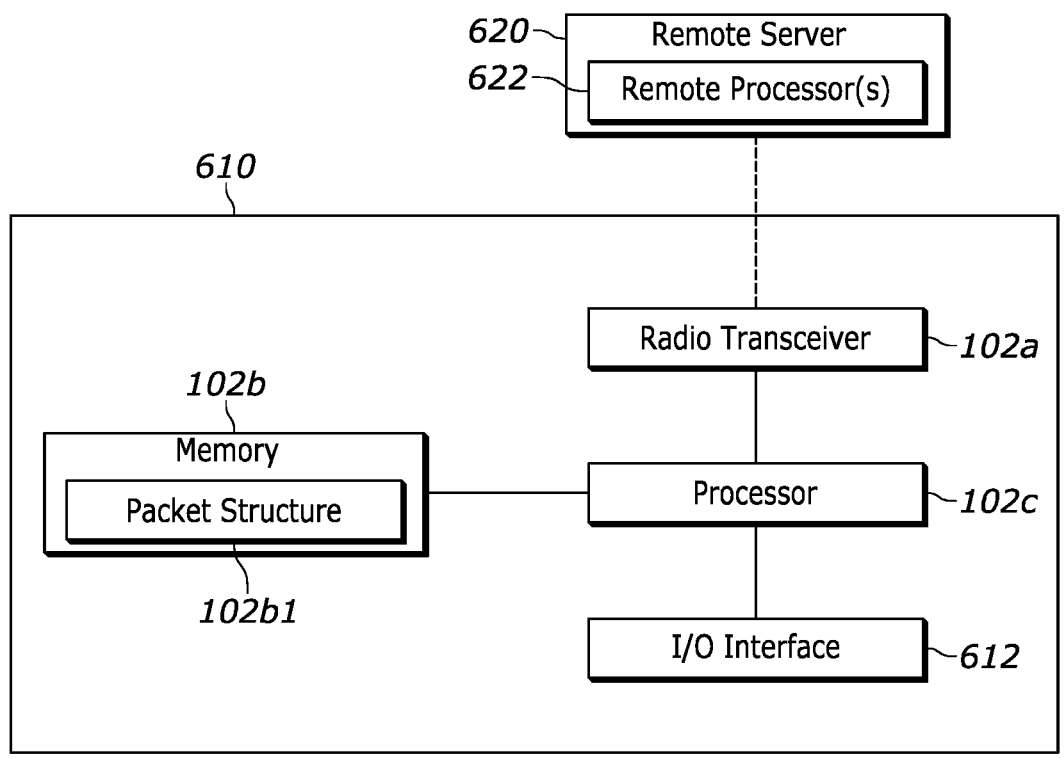
FIG. 6 is a block diagram of an example logic circuit for implementing example methods and/or operations described herein.

FIG. 6 is a block diagram representative of an example logic circuit capable of implementing example methods and/or operations described herein. As an example, the example logic circuit may be capable of implementing one or more components of the beacon device 102 of FIG. 1. The example logic circuit of FIG. 6 is a processing platform 610 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 610 of FIG. 6 includes a processor 102*c* such as, for example, one or more microprocessors, controllers, and/or any suitable type of processor. The example processing platform 610 of FIG. 6 includes memory (e.g., volatile memory, non-volatile memory) 102*b* accessible by the processor 102*c* (e.g., via a memory controller). The example processor 102*c* interacts with the memory 102*b* to obtain, for example, machine-readable instructions stored in the memory 102*b* corresponding to, for example, the operations represented by the flowcharts of this disclosure. The memory 102*b* also includes the packet structure 102*b*1 that is accessible by the example processor 102*c*. The packet structure 102*b*1 may comprise rule-based instructions configured to, for example, cause the example processor 102*c* to construct data packets in conformance with a specific data packet configuration detailed in the packet structure 102*b*1 prior to transmitting the custom data packets from a beacon device (e.g., beacon device 102). To illustrate, the example processor 102*c* may access the memory 102*b* to execute, reference, and/or otherwise interpret the packet structure 102*b*1 when the beacon device 102 creates a CBS using captured beacon information from proximate beacons (e.g., asset beacon 106*a*, waypoint beacon 105) and/or creates a WBS for transmission to proximate devices (e.g., mobile device 104). Additionally, or alternatively, machine-readable instructions corresponding to the example operations described herein may be stored on one or more removable media (e.g., a compact disc, a digital versatile disc, removable flash memory, etc.) that may be coupled to the processing platform 610 to provide access to the machine-readable instructions stored thereon.

The example processing platform 610 of FIG. 6 also includes a radio transceiver 102*a* to enable communication with other machines via, for example, one or more networks. The example radio transceiver 102*a* includes any suitable type of communication interface(s) (e.g., wired and/or wireless interfaces) configured to operate in accordance with any suitable protocol(s) (e.g., Ethernet for wired communications, and/or BLE or IEEE 802.11 for wireless communications).

The example processing platform 610 of FIG. 6 also includes input/output (I/O) interfaces 612 to enable receipt of user input and communication of output data to the user. Such user input and communication may include, for example, any number of keyboards, mice, USB drives, optical drives, screens, touchscreens, etc.

Further, the example processing platform 610 may be connected to a remote server 620. The remote server 620 may include one or more remote processors 622, and may be configured to execute instructions to, for example, implement operations of the example methods described herein, as may be represented by the flowcharts of the drawings that accompany this description.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A beacon device comprising:
   at least one processor;
   a radio transceiver; and
   a memory storing instructions that, when executed by the at least one processor, cause the beacon device to:
   receive, by the radio transceiver, a set of beacon information captured during a scan period, the set of beacon information including beacon information that is associated with an asset beacon disposed proximate to the beacon device,
   transmit, by the radio transceiver to a receiver device, a captured beacon stream (CBS), the CBS including a cycle of transmission loops, each transmission loop of the cycle of transmission loops including a set of chirps, and each chirp of the set of chirps including beacon information from the set of beacon information, and
   transmit, by the radio transceiver to a mobile device, a waypoint beacon stream (WBS) including a protocol data unit (PDU) data payload, wherein the PDU data payload encodes a media access control (MAC) identifier adjacent to a type field indicative of a format for heartbeat data encoded in the PDU data payload, wherein
   the PDU data payload is a first PDU data payload, the MAC identifier is a first MAC identifier associated with the beacon device, and the type field is indicative of a first type field value, and
   the CBS includes a second PDU data payload, the second PDU data payload encodes a second MAC identifier adjacent to the type field, the type field is indicative of a second type field value, the second type field value is indicative of the beacon information being encoded in the second PDU data payload, and the second MAC identifier is associated with the asset beacon disposed proximate to the beacon device.

2. The beacon device of claim 1, wherein the radio transceiver is a Bluetooth Low Energy (BLE) radio transceiver.

3. The beacon device of claim 1, wherein
   the PDU data payload has a packet structure comprising: (i) a prefix field, (ii) a beacon data field, (iii) a minor field, and (iv) a transmission power field, and
   the MAC identifier is encoded in the beacon data field.

4. The beacon device of claim 3, wherein the instructions, when executed by the at least one processor, further cause the beacon device to:
   transmit, by the radio transceiver, the packet structure to the mobile device, such that the mobile device can receive and decode the MAC identifier encoded in the beacon data field.

5. The beacon device of claim 3, wherein the minor field encodes (i) a current version, (ii) channel information, and (iii) a battery life, and the beacon data field is encoded by bytes assigned to a UUID field and a major field defined in an iBeacon beaconing mode.

6. The beacon device of claim 1, wherein the radio transceiver is configured to transmit the CBS with a first predefined antenna gain profile, and to transmit the WBS with a second predefined antenna gain profile that is different from the first predefined antenna gain profile.

7. The beacon device of claim 1, wherein the set of chirps is sequentially identical within each transmission loop of the cycle of transmission loops.

8. The beacon device of claim 1, wherein the radio transceiver is a set of radio transceivers, the set of radio transceivers includes a first radio transceiver, a second radio transceiver, a third radio transceiver, a fourth radio transceiver, and the beacon device further comprises:
   a first system on a chip (SoC) that includes the first radio transceiver and a first controller, wherein the first radio transceiver is configured to receive the set of beacon information on a first radio frequency (RF) channel;
   a second SoC that includes the second radio transceiver and a second controller, wherein the second radio transceiver is configured to receive the set of beacon information on a second RF channel that is different from the first RF channel;
   a third SoC that includes the third radio transceiver and a third controller, wherein the third radio transceiver is configured to receive the set of beacon information on a third RF channel that is different from the first RF channel and the second RF channel; and
   a fourth SoC that includes the fourth radio transceiver and a fourth controller, wherein the fourth radio transceiver is configured to transmit the set of beacon information to the receiver device on one of: the first RF channel, the second RF channel, or the third RF channel.

9. A method for transmitting separate advertisement streams using a beacon device, the method comprising:
   receiving, by a radio transceiver, a set of beacon information captured during a scan period, the set of beacon information including beacon information that is associated with an asset beacon disposed proximate to the beacon device;
   transmitting, by the radio transceiver to a receiver device, a captured beacon stream (CBS), the CBS including a cycle of transmission loops, each transmission loop of the cycle of transmission loops including a set of chirps, and each chirp of the set of chirps including beacon information from the set of beacon information; and
   transmitting, by the radio transceiver to a mobile device, a waypoint beacon stream (WBS) including a protocol data unit (PDU) data payload, wherein the PDU data payload encodes a media access control (MAC) identifier adjacent to a type field indicative of a format for heartbeat data encoded in the PDU data payload, wherein
   the PDU data payload is a first PDU data payload, the MAC identifier is a first MAC identifier associated with the beacon device, and the type field is indicative of a first type field value, and
   the CBS includes a second PDU data payload, the second PDU data payload encodes a second MAC identifier adjacent to the type field, the type field is indicative of a second type field value, the second type field value is indicative of the beacon information being encoded in the second PDU data payload, and the second MAC identifier is associated with the asset beacon disposed proximate to the beacon device.

10. The method of claim 9, wherein the radio transceiver is a Bluetooth Low Energy (BLE) radio transceiver.

11. The method of claim 9, wherein
the PDU data payload has a packet structure comprising: (i) a prefix field, (ii) a beacon data field, (iii) a minor field, and (iv) a transmission power field, and
the MAC identifier is encoded in the beacon data field.

12. The method of claim 11, further comprising:
transmitting, by the radio transceiver, the packet structure to the mobile device, such that the mobile device can receive and decode the MAC identifier encoded in the beacon data field.

13. The method of claim 11, wherein the minor field encodes (i) a current version, (ii) channel information, and (iii) a battery life.

14. The method of claim 11, wherein the beacon data field is encoded by bytes assigned to a UUID field and a major field defined in an iBeacon beaconing mode.

15. The method of claim 9, wherein the set of chirps is sequentially identical within each transmission loop of the cycle of transmission loops.

16. The method of claim 9, wherein the radio transceiver is a set of radio transceivers, the set of radio transceivers includes a first radio transceiver, a second radio transceiver, a third radio transceiver, a fourth radio transceiver, and the method further comprises:
receiving, by a first system on a chip (SoC) that includes the first radio transceiver and a first controller, the set of beacon information on a first radio frequency (RF) channel;
receiving, by a second SoC that includes the second radio transceiver and a second controller, the set of beacon information on a second RF channel that is different from the first RF channel;
receiving, by a third SoC that includes the third radio transceiver and a third controller, the set of beacon information on a third RF channel that is different from the first RF channel and the second RF channel; and
transmitting, by a fourth SoC that includes the fourth radio transceiver and a fourth controller, the set of beacon information to the receiver device on a fourth RF channel that is one of: the first RF channel, the second RF channel, or the third RF channel.

17. A tangible machine-readable medium comprising instructions that, when executed, cause a machine to at least:
receive a set of beacon information captured during a scan period, the set of beacon information including beacon information that is associated with an asset beacon disposed proximate to the beacon device;
transmit, to a receiver device, a captured beacon stream (CBS), the CBS including a cycle of transmission loops, each transmission loop of the cycle of transmission loops including a set of chirps, and each chirp of the set of chirps including beacon information from the set of beacon information; and
transmit, to a mobile device, a waypoint beacon stream (WBS) including a protocol data unit (PDU) data payload, wherein the PDU data payload encodes a media access control (MAC) identifier adjacent to a type field indicative of a format for heartbeat data encoded in the PDU data payload, wherein
the PDU data payload is a first PDU data payload, the MAC identifier is a first MAC identifier associated with the beacon device, and the type field is indicative of a first type field value, and
the CBS includes a second PDU data payload, the second PDU data payload encodes a second MAC identifier adjacent to the type field, the type field is indicative of a second type field value, the second type field value is indicative of the beacon information being encoded in the second PDU data payload, and the second MAC identifier is associated with the asset beacon disposed proximate to the beacon device.

18. The tangible machine-readable medium of claim 17, wherein the PDU data payload has a packet structure comprising: (i) a prefix field, (ii) a beacon data field, (iii) a minor field, and (iv) a transmission power field, the MAC identifier is encoded in the beacon data field, and the instructions, when executed, further cause the machine to at least:
transmit the packet structure to the mobile device, such that the mobile device can receive and decode the MAC identifier encoded in the beacon data field.

\* \* \* \* \*